United States Patent
Kalwa et al.

(10) Patent No.: US 12,258,486 B2
(45) Date of Patent: Mar. 25, 2025

(54) COMPOSITION FOR COATING AND SEALING THE EDGES OF WOOD FIBRE BOARDS

(71) Applicant: Flooring Technologies Ltd., Kalkara (MT)

(72) Inventors: Norbert Kalwa, Horn-Bad Meinberg (DE); Andreas Gier, Mandelbachtal (DE)

(73) Assignee: Flooring Technologies Ltd., Kalkara (MT)

(*) Notice: Subject to any disclaimer, the term of this patent is extended or adjusted under 35 U.S.C. 154(b) by 819 days.

(21) Appl. No.: 17/260,589

(22) PCT Filed: Jul. 15, 2019

(86) PCT No.: PCT/EP2019/068998
§ 371 (c)(1),
(2) Date: Jan. 15, 2021

(87) PCT Pub. No.: WO2020/016176
PCT Pub. Date: Jan. 23, 2020

(65) Prior Publication Data
US 2021/0324228 A1 Oct. 21, 2021

(30) Foreign Application Priority Data
Jul. 16, 2018 (EP) .................................... 18183673

(51) Int. Cl.
C09D 175/04 (2006.01)
B05D 7/06 (2006.01)
C09D 7/61 (2018.01)
C09D 7/63 (2018.01)

(52) U.S. Cl.
CPC ............. C09D 175/04 (2013.01); B05D 7/06 (2013.01); C09D 7/61 (2018.01); C09D 7/63 (2018.01); B05D 2203/20 (2013.01); B05D 2401/20 (2013.01); B05D 2503/00 (2013.01)

(58) Field of Classification Search
CPC ..... C09D 183/04; C09D 175/04; C08L 75/04; C08K 3/36; B05D 2401/20; B05D 2503/00
See application file for complete search history.

(56) References Cited

U.S. PATENT DOCUMENTS

| | | | |
|---|---|---|---|
| 9,180,487 B2 | 11/2015 | Weinelt et al. | |
| 9,238,767 B2 | 1/2016 | Braun et al. | |
| 9,758,431 B2 | 9/2017 | Campeol et al. | |
| 10,829,942 B2 | 11/2020 | Vandevoorde | |
| 2001/0038910 A1 | 11/2001 | MacQueen et al. | |
| 2004/0113117 A1 | 6/2004 | Matsumura et al. | |
| 2006/0073320 A1 | 4/2006 | Pervan et al. | |
| 2006/0110541 A1 | 5/2006 | Russell et al. | |
| 2008/0250978 A1 | 10/2008 | Baumgart et al. | |
| 2009/0064894 A1 | 3/2009 | Baumgart et al. | |
| 2015/0125612 A1* | 5/2015 | Campeol .................. | B01J 13/18 427/340 |
| 2016/0244629 A1* | 8/2016 | Xu ........................... | C09D 7/40 |

FOREIGN PATENT DOCUMENTS

| | | |
|---|---|---|
| CN | 103210051 A | 7/2013 |
| EP | 0903451 A2 | 3/1999 |
| JP | H11152445 A | 6/1999 |
| JP | 20007991 A | 1/2000 |
| JP | 2001329680 A | 11/2001 |
| JP | 200697321 A | 4/2006 |
| JP | 2006328406 A | 12/2006 |
| JP | 2008274242 A | 11/2008 |
| JP | 2008303291 A | 12/2008 |
| JP | 200957507 A | 3/2009 |

(Continued)

OTHER PUBLICATIONS

English Machine Translation of JP2008274242 ( A ) obtained on Oct. 12, 2023 from https://worldwide.espacenet.com/publicationDetails/biblio?CC=JP&NR=2008274242A&KC=A&FT=D&ND=3&date=20081113&DB=EPODOC&locale=en_EP (Year: 2008).*

(Continued)

*Primary Examiner* — Ling Siu Choi
*Assistant Examiner* — Olga Lucia Donahue
(74) *Attorney, Agent, or Firm* — The Webb Law Firm

(57) ABSTRACT

A composition for sealing/coating the edges of wood-fibre boards is provided. The composition includes at least one compound of general formula $R^1_a SiX_{(4-a)}$ (I), and/or their hydrolysis products. X is H, OH or a hydrolyzable group selected from alkoxy-, aryloxy-, and acyloxy-, $R^1$ is an organic radical selected from the group including alkyl, aryl, and cycloalkyl, and $R^1$ has at least one functional group $Q_1$ selected from a hydroxy, amino, monoalkylamino, carboxy, mercapto, alkoxy, aldehyde, acrylic, acryloxy, methacrylic, methacryloxy, cyano, isocyano and epoxy group, and a=0, 1, 2, 3, The composition also includes at least one compound of general formula $R^2_b SiX_{(4-b)}$ (II), and/or their hydrolysis products. X has the above meaning, $R^2$ is a non-hydrolyzable organic radical selected from alkyl, aryl, alkenyl, alkynyl, cycloalkyl, and cycloalkenyl, and b=1, 2, 3, or 4. The composition also includes at least one aqueous polymer dispersion.

16 Claims, No Drawings

(56) References Cited

FOREIGN PATENT DOCUMENTS

| | | |
|---|---|---|
| RU | 2547737 C9 | 4/2015 |
| RU | 2633008 C2 | 10/2017 |
| WO | 0153387 A1 | 7/2001 |
| WO | 2006038867 A1 | 4/2006 |
| WO | 2008078181 A1 | 7/2008 |
| WO | 2009032988 A1 | 3/2009 |
| WO | 2012017235 A1 | 2/2012 |
| WO | 2017072657 A1 | 5/2017 |

OTHER PUBLICATIONS

English Machine Translation of JP2006328406 ( A ) obtained on Oct. 17, 2023 from https://worldwide.espacenet.com/publicationDetails/biblio?CC=JP&NR=2006328406A&KC=A&FT=D&ND=3&date=20061207&DB=EPODOC&locale=en_EP (Year: 2006).*

English Machine Translation of JP2008303291 ( A ) obtained on Oct. 11, 2023 from https://worldwide.espacenet.com/publicationDetails/biblio?CC=JP&NR=2008303291A&KC=A&FT=D&ND=3&date=20081218&DB=EPODOC&locale=en_EP (Year: 2008).*

Guell et al., "Peptidotriazoles with antimicrobial activity against bacterial and fungal plant pathogens", Peptides, 2012, pp. 9-17, vol. 33.

* cited by examiner

COMPOSITION FOR COATING AND SEALING THE EDGES OF WOOD FIBRE BOARDS

CROSS-REFERENCE TO RELATED APPLICATIONS

This application is the United States national phase of International Application No. PCT/EP2019/068998 filed Jul. 15, 2019, and claims priority to European Patent Application No. 18183673.5 filed Jul. 16, 2018, the disclosures of which are hereby incorporated by reference in their entirety.

BACKGROUND OF THE INVENTION

Field of the Invention

The present invention concerns a composition for coating and sealing the edges of wood fibre boards, a process for its production, the use of this composition and wood fibre boards with this composition.

Description of Related Art

It is known that laminate flooring, especially after shifting from elements glued to one another in tongue-and-groove to glue less installation, has a weak zone in the transition of the elements with regard to moisture attack or the occurrence of moisture damage. This damage can be caused by direct exposure to moisture, over-care, etc. However, this problem is countered by the very simple and quick installation of this floor covering with the so-called click profiles. It can be assumed that well over 90% of laminate flooring today is manufactured with a Click profile.

To reduce moisture damage, various strategies have so far been used individually or in combination. The simplest way to make it more difficult for moisture to penetrate the profile is to use the tightest possible fit in the tongue and groove joint. However, this can make it more difficult to fit the elements together or cause damage. This method also has the disadvantage that if water has penetrated into the tongue and groove area, the wood-based panel will swell normally.

This effect can be increased by creating a compaction in the transition of the elements already during the direct coating by a special press plate. This is described in WO 2017/072657A1. However, this only delays the swelling and does not generally prevent it.

Another possibility is to seal the profile with hydrophobing agents. Thus, WO 2006/038867 describes the use of waxes for coating the edges, whereby at least partial penetration of the wax into the wood-based material can be observed. EP 903451 A2 describes the use of di-isocyanate-diphenylmethane for the treatment of edges, which easily penetrates into the wood-based material. In WO 2008/078181 A1, again a fluorinated polymer, e.g. perfluoroalkyl methacrylic copolymer is used as a coating agent, whereby the layer-forming material is solid at room temperature.

Other coating agents are described in WO 2012/017235 A1, WO 01/53387 A1, US 2006/0110541 A1, US 2008/0250978 A1 or WO 2009/032988 A1, among others.

WO 2012/017235 A1 concerns the use of a polymer coating on the underside of a floor covering to support the adhesion of the floor covering to a floor. WO 01/53387 A1 describes a coating for different surfaces with improved abrasion resistance. From the claims it can be concluded that the coating contains inorganic particles, such as silicon particles, a coupling reagent comprising hydrolysed silanes and a resin comprising a mixture of different acrylates. US 2006/0110541 A1 concerns processes and compositions for forming transparent protective coatings on various surfaces. US 2008/0250978 A1 and WO 2009/032988 A1 each describe a hydrophobic self-cleaning coating composition comprising modified silicon particles treated with, inter alia, organosilanes or alkylsilanes.

The disadvantage of these well-known sealants is that they often migrate into the wood-based substrate during application, thus minimizing the hydrophobic effect. However, this can also be done subsequently so that the effect is slowly lost during use.

Another possibility is the use of swell-modified wood-based panels, where higher quality glues (melamine-reinforced UF glues, PMDI, etc.) are used in the production process.

Of the measures described, only the use of higher quality glues leads to a reduction in the swelling of the boards. The others merely delay the penetration of water in the profile area.

Swelling is usually determined according to DIN EN 13329:2016 or ISO 24336: 2005 using the so-called edge swelling test. In this test, a coated sample without profile (150×50 mm) is vertically immersed 50 mm into a water bath (20° C.) and then the edge swelling is determined at three points in the immersed area after 24 h. To test the effectiveness of other measures, test methods derived from the application are usually used (water application test, damp cloth on surface).

Here, moisture stresses caused by spilled liquids or moisture acting for a long time are simulated on folded elements in the profile area.

Most products only achieve a swelling reduction of a maximum of 50% in the edge swelling test, even when measures are applied in combination. This provides a certain degree of protection when exposed to water for a short period of time, but often leads to complaints when exposed to water for a longer period of time.

Accordingly, the known measures have various disadvantages. For example, the improvement of swelling protection is too low, the proposed measures cannot withstand real loads in some cases and the effects are limited in time.

SUMMARY OF THE INVENTION

The proposed solution was thus based on the object of overcoming the disadvantages cited. In particular, the solution was based on the technical object of producing a laminate flooring which, through a combined protection, allows a reduction of edge swelling by at least 50% compared to the zero sample.

According to the proposed solution, this object is solved by a composition with the features as described herein.

Accordingly, a composition for sealing or coating the edges of wood fibre boards is provided, which can be produced from at least one compound of general formula (I)

$$R^1_a SiX_{(4-a)} \qquad (I),$$

and/or their hydrolysis products, wherein
X is H, OH or a hydrolyzable group selected from the group consisting of alkoxy, aryloxy, acyloxy, and
$R^1$ is an organic moiety selected from the group comprising alkyl, aryl, cycloalkyl, which may be interrupted by —O— or —NH—, and
wherein $R^1$ has at least one functional group $Q^1$ selected from a group containing a hydroxy, amino, monoalkylamino, carboxy, mercapto, alkoxy, aldehyde, acrylic, acryloxy, methacrylic, methacryloxy, cyano, isocyano and epoxy group, and a=0, 1, 2, 3, in particular 0 or 1 at least one compound of general formula (II)

$$R^2_b SiX_{(4-b)} \quad (II),$$

and/or their hydrolysis products, wherein

X has the above meaning, $R^2$ is a non-hydrolyzable organic moiety selected from the group comprising alkyl, aryl, alkenyl, alkynyl, cycloalkyl, cycloalkenyl, and b=1, 2, 3, or 4, and at least one polymer dispersion.

The present composition comprises with the compound of general formula (I) a cross-linking component and with the compound of general formula (II) a hydrophobic component. The hydrophilic crosslinking component of formula (I) makes it possible, on the one hand, to bond the compound to the wood fibres, in particular via the free —OH groups (present or formed by hydrolysis of, for example, alkoxy groups) and, on the other hand, to form a network. The hydrophobic component of formula (II)—formed e.g. from the alkyl groups of the moiety $R^2$—forms a water-repellent barrier. In this way the water cannot diffuse through the network of the formed coating.

The present composition allows the pores in the fibreboard to fill up and envelop the wood fibres, thus "sealing" them. On the other hand, by using hydrophobic modifications, a "hydrophobicization" of the remaining pores and the still uncoated wood fibres is built up.

In order to achieve the highest possible flexibility of the coating, the inorganic binder is mixed with a suitable, aqueous polymer dispersion. The polymers used have functional groups that are compatible with the inorganic matrix. Therefore it is possible to produce a coating with a high degree of cross-linking even at low temperatures.

As will be explained in detail later, the present composition can be used for any panel system and gluing system. Thus, the composition reduces swelling in wood fibre boards regardless of the glue systems used, different porosity or board thickness. The swelling reducing effect of the present composition could be proven for HDF boards with urea-formaldehyde glue (UF glue), melamine-urea-formaldehyde glue (MUF glue) or polyurethane-based glue (PMDI glue) or also for boards made of wood plastic composites (WPC).

The composition according to the solution offers several advantages. For example, the swelling of the edges is significantly reduced, the composition does not penetrate or migrate into the boards, the composition can be used with any board and glue system and only relatively small application quantities are required.

The hydrolysable moiety X is advantageously selected from a group containing H, OH, $C_{1-6}$-alkoxy, especially methoxy, ethoxy, n-propoxy and butoxy, $C_{6-10}$-aryloxy, especially phenoxy, $C_{2-7}$-acyloxy, especially acetoxy or propionoxy. Particularly preferred is the moiety X H, OH or alkoxy, especially methoxy, ethoxy, n-propoxy or i-propoxy.

The organic moiety $R^1$ is preferably selected from a group comprising $C_1-C_{30}$ alkyl, in particular $C_5-C_{25}$ alkyl, $C_2-C_6$ alkenyl, $C_3-C_8$ cycloalkyl and $C_3-C_8$ cycloalkenyl. In one embodiment the organic $R^1$ is selected from the group comprising methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, butadienyl or cyclohexadienyl, preferably methyl, ethyl, propyl or vinyl.

In an embodiment of the present composition, the at least one functional group $Q^1$ is selected from a group containing epoxy, hydroxy, ether, acrylic, acryloxy, methacrylic, methacryloxy, amino, alkoxy, cyano and/or isocyano groups. The functional group $Q^1$ can therefore advantageously carry a residue with a double bond or an epoxy group, which can be activated and polymerised by means of UV radiation.

In a variant of the present composition compounds of general formula (I) according to $R^1_a SiX_{(4-a)}$, in particular $R^1 SiX_3$, with a functional group $Q^1$ may be selected from methacryloxypropyltrimethoxysilane (MPTS), aminoethyl-aminopropyltrimethoxysilane, silanes with an epoxy functionalization such as glycidyl-oxypropyltriethoxysilane, or silanes with a vinyl functionalization such as vinyltrimethoxysilane.

As described, the remainder $R^1$ may have at least one functional group $Q^1$. In addition, the $R^1$ group may also be substituted with other groups.

The term "substituted", in use with "alkyl", "alkenyl", "aryl", etc., means the substitution of one or more atoms, usually H atoms, by one or more of the following substituents, preferably by one or two of the following substituents halogen, hydroxy, protected hydroxy, oxo, protected oxo, $C_3-C_7$ cycloalkyl, bicyclic alkyl, phenyl, naphthyl, amino, protected amino, monosubstituted amino, protected monosubstituted amino, disubstituted amino, guanidino, protected guanidino, a heterocyclic ring, a substituted heterocyclic ring, imidazolyl, indolyl, pyrrolidinyl, $C_1-C_{12}$ alkoxy, $C_1-C_{12}$ acyl, $C_1-C_{12}$ acyloxy, acryloyloxy, nitro, carboxy, protected carboxy, carbamoyl, cyano, methylsulfonylamino, thiol, $C_1-C_{10}$ alkylthio and $C_1-C_{10}$ alkylsulfonyl. The substituted alkyl groups, aryl groups, alkenyl groups, may be substituted once or several times and preferably once or twice, with the same or different substituents.

The term "alkinyl", as used here, denotes a moiety of formula R—C≡C—, in particular a "$C_2-C_6$ alkinyl". Examples of $C_2-C_6$ alkinyls include: ethinyl, propinyl, 2-butinyl, 2-pentinyl, 3-pentinyl, 2-hexinyl, 3-hexinyl, 4-hexinyl, vinyl, and di- and tri-ines of straight and branched alkyl chains.

The term "aryl", as used herein, refers to aromatic hydrocarbons such as phenyl, benzyl, naphthyl, or anthryl. Substituted aryl groups are aryl groups that are substituted with one or more substituents as defined above.

The term "cycloalkyl" covers the groups cyclopropyl, cyclobutyl, cyclopentyl, cyclohexyl and cycloheptyl.

In a particularly preferred variant of the present composition, the compound corresponds to the general formula (I) of formula $SiX_4$, the moiety X being OH or alkoxy, in particular methoxy, ethoxy, n-propoxy or i-propoxy. Tetramethoxysilane and tetraethoxysilane are used as particularly preferred crosslinking agents.

In a further embodiment of the present composition, the non-hydrolysable organic moiety $R^2$ of the compound according to formula (II) is selected from a group comprising $C_1-C_{15}$ alkyl, in particular $C_1-C_{10}$ alkyl, $C_2-C_6$ alkenyl, $C_2-C_6$ alkinyl and $C_6-C_{10}$ aryl. These may be unsubstituted or substituted by a further hydrophobic group.

It is preferred when the non-hydrolyzable organic moiety $R^2$ is selected from the group comprising methyl, ethyl, n-propyl, isopropyl, n-butyl, s-butyl, t-butyl, pentyl, hexyl, heptyl, octyl, nonyl, cyclohexyl, vinyl, 1-propenyl, 2-propenyl, butenyl, acetylenyl, propargyl, phenyl and naphthyl. Methyl, ethyl, propyl, octyl or phenyl residues are particularly preferred.

In the context of the solution the term "non-hydrolysable organic moiety" is to be understood as an organic moiety which, in the presence of water, does not lead to the formation of an OH group or $NH_2$ group linked to the Si atom.

The compound of formula (II) may in particular comprise one of the following formulae:
- $R^2_4Si$ with $R^2$ as $C_1$-$C_5$ alkyl group, preferably methyl or ethyl such as tetramethylsilane;
- $R^2_3SiX$ with $R^2$ as $C_1$-$C_5$ alkyl group, preferably methyl or ethyl and with X as H, such as trimethylsilane;
- $R^2SiX_3$ with $R^2$ as $C_1$-$C_{10}$ alkyl group, preferably methyl, ethyl, propyl, pentyl, hexyl, heptyl, octyl, or as $C_6$-$C_{10}$ aryl group, preferably phenyl, and with X as alkoxy, in particular methoxy, ethoxy, n-propoxy or i-propoxy, such as octyltriethoxysilane, phenyltriethoxysilane.

In a variant of the present composition a compound of general formula (I) and a compound of general formula (II) are used, respectively.

However, another variant of the present composition may also contain at least one compound of general formula (I) and at least two, preferably at least three, compounds of general formula (II). Any combination is conceivable here.

Thus, in a variant, the composition may contain tetraethoxysilane as a compound of formula (I) and trimethylsilane and phenyltriethoxysilane as compounds of formula (II).

In another variant, the composition contains tetraethoxysilane as compound of formula (I) and trimethylsilane, phenyltriethoxysilane and octyltriethoxysilane as compounds of formula (II).

In a further embodiment the compound of the general formula (I) is contained in the composition in a molar amount between 0.08-0.2 mol, preferably 0.1-0.15 mol, in particular preferably 0.1-0.12 mol, and the compound of the general formula (II) is contained in the composition in a molar amount between 0.05 and 0.1 mol, preferably between 0.06 and 0.09 mol, in particular preferably between 0.07 and 0.08 mol.

The range of molar amount indicated for the compound of general compound (II) may refer to one compound or to the sum of two compounds or three compounds of general formula (II).

Thus, the variant of the composition consisting of tetraethoxysilane as compound of formula (I) and trimethylsilane and phenyltriethoxysilane as compounds of formula (II) may contain 0.15 mol of tetraethoxysilane and 0.04 mol of trimethylsilane/0.033 mol of phenyltriethoxysilane.

In the other variant of the composition of tetraethoxysilane as compound of formula (I) and trimethylsilane, phenyltriethoxysilane and octyltriethoxysilane as compounds of formula (II), there may be 0.1 mol of tetraethoxysilane and 0.03 mol of trimethylsilane/0.025 mol of phenyltriethoxysilane and 0.043 mol of octyltriethoxysilane.

The ratio of the silane compound of formula (I) to the silane compounds of formula (II) is preferably between 1:0.5 and 1:2, particularly preferably between 1:0.75 and 1:1.5, very preferably between 1:1 and 1:1.2.

In a more extensive embodiment of the present composition, the at least one polymer is selected from the group comprising polyurethanes, epoxy resins; melamine resins, such as melamine-formaldehyde resin, and polyacrylates.

The use of a polyurethane polymer is preferred, the polyurethane polymer being based on aromatic polyisocyanates, in particular polydiphenylmethane diisocyanate (PMDI), tolylene diisocyanate (TDI) and/or diphenylmethane diisocyanate (MDI), PMDI being particularly preferred.

The polymer is incorporated into the network formed by the silane compounds and gives the composition flexible properties that facilitate application.

The type of polymer used is preferably adapted to the silane compounds used. It is therefore advantageous to use silanes modified with epoxy groups together with epoxy polymers and silanes modified with methacrylate groups together with acrylate polymer.

In another embodiment of the present composition it is also possible to use more than one polymer.

In a further embodiment the content of the polymer in the composition used in the present case is at least 30% by weight, preferably at least 20% by weight, in particular preferably at least 10% by weight. In one embodiment, the ratio of sol-gel to polymer is between 1:0.1 and 1:0.5, preferably between 1:0.2 and 1:0.4 (based on solids).

The solvent content, which is mainly due to the use of the silanes, is between 1 and 15% by weight, preferably 2 to 13% by weight, especially preferably between 4 to 10% by weight. These figures do not take into account the solvent content of the polymer used. Solvents are especially water and/or alcohols, preferably ethanol. The alcohol content can be e.g. <1%. It is also possible that the present composition contains only alcohol and little or no water, i.e. the silane compounds and also the polymer dispersion can be used in an alcoholic form.

In a further embodiment the present composition may contain inorganic particles, especially $SiO_2$, $Al_2O_3$, $ZrO_2$, $TiO_2$ particles. The particles preferably used here have a size between 2 and 400 nm, preferably between 2 and 100 nm, especially preferably between 2 and 50 nm. By adding the inorganic particles, the solids content of the composition is increased, which improves the application behaviour of the composition. The addition of inorganic particles also prevents shrinkage and cracking. The inorganic particles can be used in a quantity range from 0.1 to 25 weight %, preferably 5 to 20 weight %, based on the solids content of the silane material (sol-gel material).

A particularly preferred variant of the present composition comprises tetraethoxysilane, trimethylsilane, phenyltriethoxysilane, octyltriethoxysilane and polyurethane.

A very special preferred variant of the present composition comprises tetraethoxysilane, trimethylsilane, phenyltriethoxysilane, octyltriethoxysilane, polyurethane and $SiO_2$ particles.

The composition used in the present case can be prepared in a process comprising the following steps:
- providing at least one compound of general formula (I) and at least one compound of general formula (II);
- optional adding at least dispersion of inorganic particles;
- adding at least one catalyst, in particular an acid, to the mixture of at least one compound of formula (I) and at least one compound of formula (II);
- separating the aqueous phase of the reaction mixture of at least one compound of formula (I) and at least one compound of formula (II), and
- adding at least one polymer to the separated aqueous reaction mixture of at least one compound of formula (I) and at least one compound of formula (II).

Inorganic and/or organic acids suitable as catalysts are selected from a group containing phosphoric acid, acetic acid, p-toluene sulphonic acid, hydrochloric acid, formic acid or sulphuric acid. Also suitable are ammonium salts such as ammonium sulphate, which react as weak acids. p-Toluene sulphonic acid is particularly preferred.

For subsequent neutralisation of the reaction mixture, a basic compound such as ammonia is preferably added. This leads to a separation of the aqueous phase with the binder portion from the alcoholic phase (ethanolic phase). The aqueous phase can then be easily separated from the alcoholic phase.

In the case where inorganic particles are added to the binder composition the inorganic particles are preferably used in an amount between 0.1 to 15% by weight, preferably 0.5 to 10% by weight, especially preferably between 1 to 5% by weight.

As mentioned above, the present composition can be used for coating or sealing the edges of wood fibre boards, especially WPC, HDF or MDF boards.

The object is also solved by a wood fibre board with the present composition.

Accordingly, at least one wood fibre board, such as HDF or MDF board, comprises at least one composition according to the solution, with which in particular the edges of the wood fibre board are coated for the purpose of sealing.

The composition can be applied to the edges of the wood fibre boards e.g. by spraying, rolling or using a vacuum cleaner.

The layer thickness of the composition on the board edge can be in a range between 10 and 50 μm, preferably between 20 and 40 μm.

The composition can be applied in liquid form to the edges of the panels with a quantity between 100 and 200 silane fl. $g/m^2$, preferably between 120 and 150 silane fl·$g/m^2$. This results in a solid content on the panel edge of between 5 and 25 $mg/cm^2$, preferably between 10 and 20 $mg/cm^2$.

The fibre boards in question can have different binder systems, which are mixed with the wood fibres and pressed as a binder. Preferred binder systems are: formaldehyde resins, such as urea-formaldehyde resins, melamine-formaldehyde resins, melamine-urea-formaldehyde resins; polyurethanes, preferably based on polydiphenylmethane diisocyanate (PMDI), epoxy resin or polyester resins.

The fibre boards in question can also have a coating on the top side of the board with films, e.g. films made of thermoplastic materials such as PVC or PP, or paper layers, such as decorative paper layers or overlay papers.

Wood fibre boards are particularly preferred:
HDF board with urea-formaldehyde glue and impregnated with a prepolymer of isocyanate and polyol;
HDF board with urea-formaldehyde glue and foil, such as PVC foil, glued to at least one of the top sides of the board;
HDF board with melamine urea formaldehyde glue;
HDF board with PMDI glue, and
WPC board with glued-on film, like polypropylene (PP) film.

Accordingly, HDF boards are first produced with higher quality glues (MUF glue, PMDI glue) or HDF produced with standard UF glue is subsequently impregnated completely with a PU prepolymer at an impregnation station. These boards are then coated in a KT press with layers of paper impregnated with melamine resin (overlay paper, decor paper and backing paper). This is done under high pressure and high temperatures (p=40 bar, T=200° C., t=15 sec). After the coated boards have cooled down, they are prepared for plank production. As further variants, WPC and HDF boards are coated with thermoplastic films. All variants were cut into planks on a flooring line and sealed in the profile on the edges with the composition according to the solution. Comparative samples without sealing were also produced. The applied composition is thermally activated by IR radiators. The activation energy at the plank must be at least 80° C.

DETAILED DESCRIPTION OF THE INVENTION

The solution is explained in more detail below with reference to the examples.

Example 1: Preparation of a Sealant Composition 12.3 g Ocytltriethoxysilane, 2.4 g trimethylsilane, 6.1 g phenyltriethoxysilane, 20.8 g tetraethoxysilane and 28.8 g of an aqueous $SiO_2$ dispersion (50% by weight) from Fa. Obermaier are added, heated to 80° C. and stirred, 3.6 g para toluenic acid is now added to water (30% by weight) while stirring and stirred for 120 minutes. After another 24 hours the pH value is raised to a pH value of 7 by adding a 25% ammonia solution (in the above example 6.2 g) while stirring.

After a further stirring time of 2 hours, 80 g of water is now added, stirred again for 30 minutes and then the suspension is stored for 4 hours without stirring.

After this waiting time, the aqueous phase with the binder portion separates from the ethanolic phase. The aqueous phase is now separated by a separating funnel. Thus, the inorganic aqueous coating system is obtained.

50 g of this coating system (solid: 52%) is now mixed with 20 g of an aqueous polyurethane solution (Fa. Alberdingk U 3251, solid: 35%).

The coating system can now be applied to an edge with a foam roller or pipette and thermally cured (e.g. 100° C., 5 minutes).

Example 2: HDF with UF Glue and Prepolymer

A 7.4 mm HDF with a density of approx. 850 $kg/m^3$ is cast in a casting machine with a prepolymer in a quantity of 1.2 $kg/m^2$. The board is transferred to a vacuum station and the prepolymer is sucked into the HDF by means of vacuum. The boards are then stored for three days, then coated in a KT press with melamine resin impregnated papers (overlay, decor and backing) under pressure and temperature (p=40 bar, T=200° C., t=15 sec).

The boards are transferred to a ripening warehouse for cooling and after three days are cut into planks on a flooring line. They are then provided with tongue and groove, and then the profiles are sprayed in a continuous flow with the composition of example 1 (application quantity: 100 g fl./$m^2$, solids content: approx. 42%). The silane was dried with an IR radiator. For comparison, a board was cut into planks without edge sealing.

Example 3: MDF with PMDI Glue

HDF boards were produced on an MDF line using a PMDI binder. A gluing factor of 8% and a bulk density of 850 $kg/m^3$ was used. The HDF was cooled and sanded after the press. The boards were then stored for three days, then coated in a KT press with melamine resin impregnated papers (overlay, decor and backing) under pressure and temperature (p=40 bar, T=200° C., t=15 sec).

The boards are transferred to a ripening warehouse for cooling and after three days are cut into planks on a flooring line. They are then provided with tongue and groove, and then the profiles are sprayed in a continuous flow with the composition of example 1 (application quantity: 100 g fl./m², solids content: approx. 42%). The silane was dried with an IR radiator. For comparison, a board was cut into planks without edge sealing.

Example 4: HDF with MUF Glue

HDF boards were produced on an MDF line with a MUF binder. A gluing factor of 25%, a melamine reinforcement of 24% and a bulk density of 850 kg/m³ were used. The HDF was cooled and sanded after the press. The boards were then stored for three days, then coated in a KT press with melamine resin impregnated papers (overlay, decor and backing) under pressure and temperature (p=40 bar, T=200° C., t=15 sec).

The boards are transferred to a ripening warehouse for cooling and after three days are cut into planks on a flooring line. They are then provided with tongue and groove, and then the profiles are sprayed in a continuous flow with the composition of example 1 (application quantity: 100 g fl./m², solids content: approx. 42%). The silane was dried with an IR radiator. For comparison, a board was cut into planks without edge sealing.

Example 5: Edge Swell Test

For the edge swelling test, two×two samples were cut from each of the coated boards (150×50 mm×thickness). Half of the samples were then sealed at the cut edges with the composition of example 1, whereby the application quantity was always approx. 100 g/m². Then the edge swelling test was carried out according to ISO 24336:2005.

The swelling is determined according to DIN EN 13329: 2016 or ISO 24336: 2005 using the so-called edge swelling test. In this test, a coated sample without profile (150×50 mm) is vertically immersed 50 mm into a water bath (20° C.) and then the edge swelling is determined at three points in the immersed area after 24 h. The results are summarized in the following table.

| Example | Sample description* | Thickness in mm | Edges-source in % | Reduction compared to zero sample in %. |
|---|---|---|---|---|
| | Zero sample UF glue** | 7.4 | 16.2 | — |
| | Zero sample UF glue + edge sealing | 7.4 | 8.1 | 50.0 |
| 2 | HDF UF glue with prepolymer | 7.4 | 5.25 | — |
| 2 | HDF UF glue with prepolymer + edge sealant | 7.4 | 2.3 | 56.2 |
| 3 | HDF with PMDI*** | 7.4 | 9.7 | — |
| 3 | HDF with PMDI + Edge sealing | 7.4 | 6.6 | 32 |
| 4 | HDF with MUF glue**** | 7.4 | 8.1 | — |
| 4 | HDF with MUF glue + Edge sealing | 7.4 | 2.6 | 68 |
| | WPC with glued-on PP film***** | 4.5 | 11.0 | — |
| | WPC with glued-on PP film + edge sealing | 4.5 | 5.9 | 46.4 |
| | HDF UF glue with PVC film | 9.0 | 9.9 | — |
| | HDF UF glue with PVC film + edge sealing**** | 9.0 | 4.8 | 51.5 |

* The silane-based edge sealant was applied in a quantity of approx. 100 g fl. /m².
** The HDF had a density of approx. 850 kg/m³ and was coated with a standard Floor construction (overlay, decor and backing).
*** The HDF had a bulk density of 850 kg/m³ and a gluing of approx. 8% related to fibres and was coated with a standard Floor construction (overlay, decor and backing).
**** The HDF had a density of approx. 850 kg/m³ and a gluing of 25% of a with 24% melamine-reinforced UF glue and was coated with a standard Floor construction (overlay, decor and backing).
***** The WPC consisted of approx. 50% by weight PET fibres and approx. 50% by weight Wood fibres. A 0.4 mm thick PET film was glued to the board with the help of a PU Hotmelts.
****** The HDF had a bulk density of 850 kg/m3. A 0.5 mm thick PVC film is glued onto it with the help of a PU-Hotmelts.

As can be seen from the table, a reduction in edge swelling is more or less clearly possible, regardless of the glue system used and the panel composition. This sealing system can therefore be used for a wide range of different panel types.

The invention claimed is:

1. A composition for sealing/coating the edges of wood-fibre boards, obtained from
at least one compound of general formula (I)

$$SiX_4 \quad (I),$$

wherein
X is alkoxy, and
at least three compounds of general formula (II)

$$R_2SiX_3 \quad (II),$$

wherein
X is alkoxy,
$R^2$ is a C1-C10 alkyl moiety or a C6-C10 aryl moiety,
wherein the ratio of the at least one compound of general formula (I) to the at least three compounds of general formula (II) is between 1:0.5 and 1:2;
at least one aqueous polymer dispersion, wherein the at least one polymer is selected from the group comprising polyurethanes, epoxy resins, melamine resins, and/or polyacrylates; and
inorganic particles selected from the group consisting of $SiO_2$, $Al_2O_3$, $ZrO_2$, $TiO_2$, and mixtures thereof,
wherein the inorganic particles comprise 0.1 to 10% by weight of the composition based upon the total weight of the composition.

2. The composition according to claim 1, wherein each X is independently selected from $C_{1-6}$-alkoxy.

3. The composition according to claim 2, wherein the $C_{1-6}$-alkoxy comprises methoxy, ethoxy, n-propoxy or butoxy.

4. The composition according to claim 1, wherein non-hydrolyzable organic $R^2$ is selected from the group consisting of methyl, ethyl, n-propyl, isopropyl, n-butyl, s-butyl, t-butyl, pentyl, hexyl, heptyl, octyl, nonyl, cyclohexyl, phenyl and naphthyl.

5. The composition according to claim 1, wherein the compound of general formula (I) is contained in a molar amount between 0.08-0.2 mol, and the compound of general formula (II) is contained in a molar amount between 0.05 and 0.1.

6. The composition according to claim 1, wherein the at least one polymer is selected from the group comprising polyurethanes.

7. A method for preparing a composition according to claim 1 comprising the steps of
providing at least one compound of general formula (I) and at least three compounds of formula (II)
optionally adding at least one dispersion of inorganic particles;
adding at least one catalyst to the mixture of at least one compound of formula (I) and at least three compounds of formula (II);
separating the aqueous phase of the reaction mixture of at least one compound of formula (I) and at least three compounds of formula (II), and
adding at least one polymer to the separated aqueous reaction mixture of at least one compound of formula (I) and at least three compounds of formula (II).

8. A fibre board, comprising the composition according to claim 1 applied to the edges of the fibre board.

9. The composition according to claim 1, wherein the alkoxy comprises methoxy, ethoxy, n-propoxy, or i-propoxy.

10. The composition according to claim 1, wherein the inorganic particles are present in an amount from 5 to 20 weight percent, based on the solids content of the at least one compound of general formula (I) and the at least three compounds of general formula (II).

11. A wooden fibre board comprising edges, wherein the edges are coated with at least one composition obtained from
at least one compound of general formula (I)

$$SiX_4 \qquad (I),$$

wherein
X is alkoxy, and
at least three compounds of general formula (II)

$$R^2SiX_3 \qquad (II),$$

wherein
X is alkoxy,
$R^2$ is a C1-C10 alkyl moiety or a C6-C10 aryl moiety,
wherein the ratio of the at least one compound of general formula (I) to the at least three compounds of general formula (II) is between 1:0.5 and 1:2;
at least one aqueous polymer dispersion, wherein the at least one polymer is selected from the group comprising polyurethanes, epoxy resins, melamine resins, and/or polyacrylates; and
inorganic particles selected from the group consisting of $SiO_2$, $Al_2O_3$, $ZrO_2$, $TiO_2$, and mixtures thereof,
wherein the inorganic particles comprise 0.1 to 10% by weight of the composition based upon the total weight of the composition.

12. The wooden fibre board according to claim 11, wherein the board is a high density fibre (HDF) board or a medium density fibre (MDF).

13. The wooden fibre board according to claim 11, wherein the layer thickness of the composition on the board edges is 10 µm to 50 µm.

14. A method for coating and/or sealing the edges of a wood fiber board comprising: applying a composition to the edges of the wood fibre board by spraying, rolling, or using vacuum, the composition obtained from
at least one compound of general formula (I)

$$SiX_4 \qquad (I),$$

wherein
X is alkoxy, and
at least three compounds of general formula (II)

$$R^2SiX_3 \qquad (II),$$

wherein
X is alkoxy,
$R^2$ is a C1-C10 alkyl moiety or a C6-C10 aryl moiety,
wherein the ratio of the at least one compound of general formula (I) to the at least three compounds of general formula (II) is between 1:0.5 and 1:2;
at least one aqueous polymer dispersion, wherein the at least one polymer is selected from the group comprising polyurethanes, epoxy resins, melamine resins, and/or polyacrylates; and
inorganic particles selected from the group consisting of $SiO_2$, $Al_2O_3$, $ZrO_2$, $TiO_2$, and mixtures thereof,
wherein the inorganic particles comprise 0.1 to 10% by weight of the composition based upon the total weight of the composition.

15. The method according to claim 14, wherein the wood fibre board is a high density fibre (HDF) board, a medium density fibre (MDF) board, or a wood plastic composite (WPC) board.

16. The method according to claim 15, wherein the composition is applied in liquid form to the edges of the wood fibre board in a quantity of 100 silane fl. g/m² to 200 silane fl. g/m² resulting in a solid content on the panel edge of 5 mg/cm² to 25 mg/cm².

* * * * *

UNITED STATES PATENT AND TRADEMARK OFFICE
CERTIFICATE OF CORRECTION

PATENT NO. : 12,258,486 B2
APPLICATION NO. : 17/260589
DATED : March 25, 2025
INVENTOR(S) : Norbert Kalwa It is certified that error appears in the above-identified patent and that said Letters Patent is hereby corrected as shown below:

In the Claims

Column 10, Line 33, Claim 1, delete "$R_2SiX_3$" and insert -- $R^2SiX_3$ --

Signed and Sealed this
First Day of July, 2025

Coke Morgan Stewart
*Acting Director of the United States Patent and Trademark Office*